(12) United States Patent
Barr et al.

(10) Patent No.: US 7,536,355 B2
(45) Date of Patent: May 19, 2009

(54) CONTENT SECURITY SYSTEM FOR SCREENING APPLICATIONS

(75) Inventors: David A. Barr, San Jose, CA (US); Aaron G. Wells, Piedmont, CA (US)

(73) Assignee: LSI Corporation, Milpitas, CA (US)

( * ) Notice: Subject to any disclaimer, the term of this patent is extended or adjusted under 35 U.S.C. 154(b) by 854 days.

(21) Appl. No.: 11/021,101

(22) Filed: Dec. 22, 2004

(65) Prior Publication Data

US 2005/0278257 A1 Dec. 15, 2005

Related U.S. Application Data

(60) Provisional application No. 60/579,131, filed on Jun. 10, 2004.

(51) Int. Cl.
*H04K 1/00* (2006.01)
*H04L 9/00* (2006.01)

(52) U.S. Cl. .............................. 705/57; 705/51; 705/71; 705/75

(58) Field of Classification Search .................... 705/57
See application file for complete search history.

(56) References Cited

U.S. PATENT DOCUMENTS

| | | | |
|---|---|---|---|
| 6,256,392 B1 * | 7/2001 | Sako et al. ................. | 380/203 |
| 7,024,393 B1 * | 4/2006 | Peinado et al. ................ | 705/59 |
| 2001/0021255 A1 * | 9/2001 | Ishibashi ..................... | 380/277 |
| 2002/0104098 A1 * | 8/2002 | Zustak et al. ................ | 725/131 |
| 2003/0005309 A1 * | 1/2003 | Ripley et al. ................ | 713/185 |
| 2003/0007640 A1 * | 1/2003 | Harada et al. ................ | 380/270 |
| 2004/0088510 A1 * | 5/2004 | Hori ........................... | 711/165 |
| 2004/0088554 A1 * | 5/2004 | Kawaguchi ................. | 713/189 |
| 2004/0243814 A1 * | 12/2004 | Nakano et al. .............. | 713/189 |
| 2005/0058318 A1 * | 3/2005 | Rhoads ....................... | 382/100 |
| 2005/0102397 A1 * | 5/2005 | Tsuyama et al. ............ | 709/225 |
| 2005/0138400 A1 * | 6/2005 | Wu et al. ..................... | 713/189 |
| 2005/0177740 A1 * | 8/2005 | Athaide et al. .............. | 713/189 |
| 2005/0188194 A1 * | 8/2005 | Fascenda .................... | 713/155 |
| 2006/0149683 A1 * | 7/2006 | Shimojima et al. ........... | 705/59 |
| 2006/0156003 A1 * | 7/2006 | Zhang et al. ................ | 713/176 |

\* cited by examiner

*Primary Examiner*—Calvin L Hewitt, II
*Assistant Examiner*—Dante Ravetti
(74) *Attorney, Agent, or Firm*—Christopher P. Maiorana, PC

(57) ABSTRACT

A method for securing a content is disclosed. The method generally includes the steps of (A) generating a media key by decrypting a media key block based on a device key unique to a particular player of a plurality of players, (B) modifying the media key by decryption based on a class key such that the media key is unique for each of a plurality of subscriber classes, (C) writing an encrypted title key in a media by encrypting a title key based on both the media key after modification and a media identification value unique to the media and (D) writing an encrypted content in the media by encrypting the content based on the title key.

26 Claims, 4 Drawing Sheets

CONTENT SECURITY SYSTEM FOR SCREENING APPLICATIONS

This application claims the benefit of U.S. Provisional Application No. 60/579,131, filed Jun. 10, 2004, which is hereby incorporated by reference in its entirety.

FIELD OF THE INVENTION

The present invention relates to controlled access systems generally and, more particularly, to a content security system for screening applications.

BACKGROUND OF THE INVENTION

Limited distributions of new movies, recently filmed scenes and various programs for award ceremony voting use extraordinary security measures to ensure that the contents are only seen by authorized viewers and to keep the contents from being bootlegged. Recordable DVD-video disks are a popular method for limited distribution since the people receiving the disks is known. Distributions range from entire movies to specific scenes filmed a few hours earlier. The recent scenes are commonly referred to as "digital dailies". Internet distribution is also utilized where digital dailies are transmitted from remote filming locations back to studios for executive review. Unfortunately, control of the DVD disks and Internet transmissions can be compromised resulting in unauthorized copies becoming available to the public.

SUMMARY OF THE INVENTION

The present invention concerns a method for securing a content. The method generally comprises the steps of (A) generating a media key by decrypting a media key block based on a device key unique to a particular player of a plurality of players, (B) modifying the media key by decryption based on a class key such that the media key is unique for each of a plurality of subscriber classes, (C) writing an encrypted title key in a media by encrypting a title key based on both the media key after modification and a media identification value unique to the media and (D) writing an encrypted content in the media by encrypting the content based on the title key.

The objects, features and advantages of the present invention include providing a content security method and system for screening applications that may (i) provide a high degree of control over content screening, (ii) frustrate unauthorized digital copying, (iii) corrupt unauthorized analog copying, (iv) provide forensic evidence in unauthorized copies, (v) provide revokable authorization and/or (vi) provide a hierarchical class structure of permissions.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
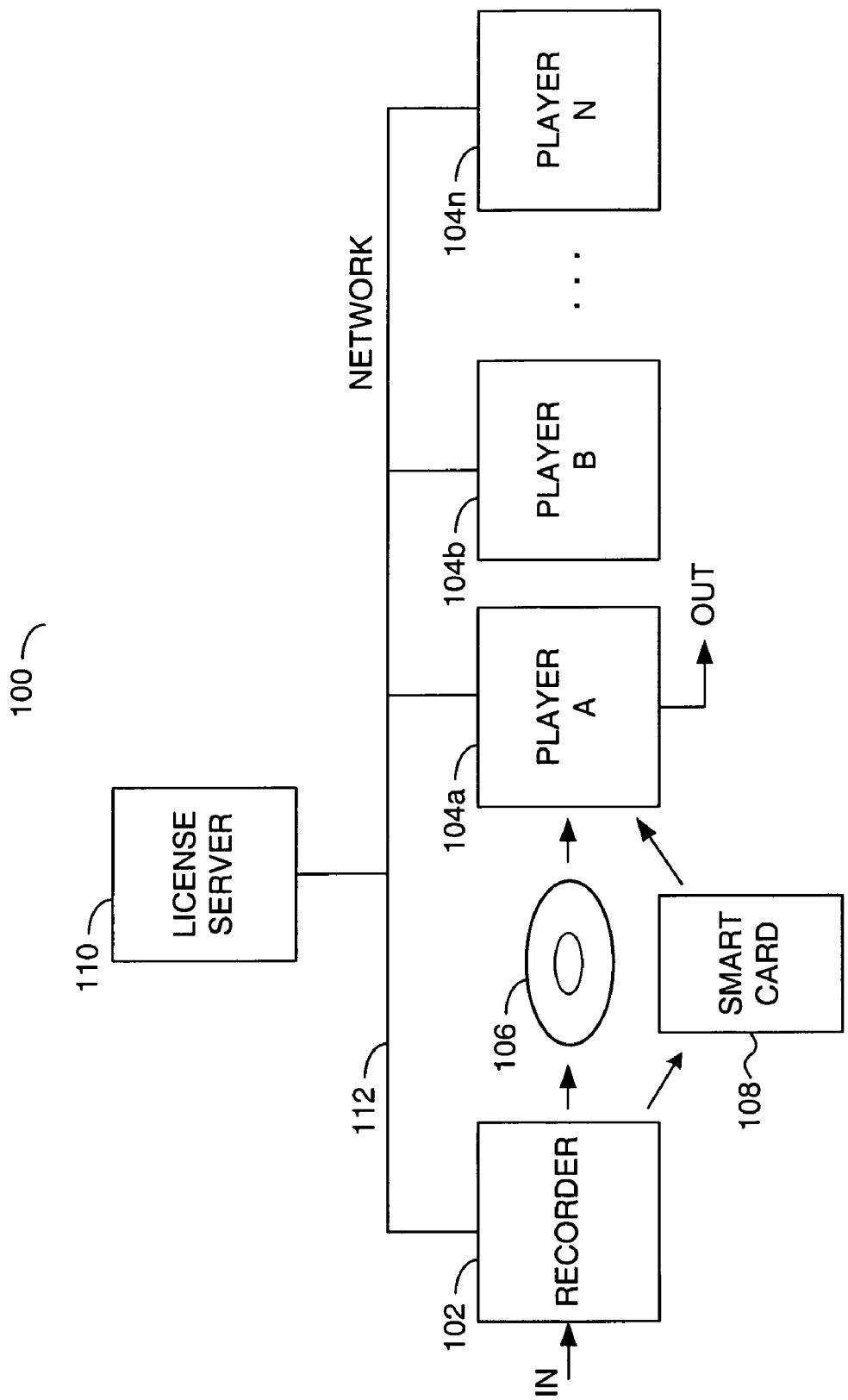
FIG. 1 is a block diagram of a system in accordance with a preferred embodiment of the present invention.

Referring to FIG. 1, a block diagram of a system 100 is shown in accordance with a preferred embodiment of the present invention. The system 100 generally comprises a recorder 102, one or more players 104a-104n, a disk media 106, a card media 108, an optional server 110 and an optional network 112. The network 112 may connect the recorder 102 to the server 110. The network 112 may also connect the server 110 to the players 104a-104n (generically referred to as the players 104). The disk media 106 may be physically transferred from the recorder 102 to a particular one of the players 104 (e.g., a player 104a). The card media 108 may be transferred along with the disk media 106 to the particular player 104a. The recorder 102 may receive a signal (e.g., IN) containing a content to be authored, distributed and controlled. The content may include video streams, audio streams and/or related data. Each player 104 authorized to play the content may generate a signal (e.g., OUT) carrying the content. The recorder 102 may be operational to generate a secured content from the received content. The secured content may be transferred to the players 104 via the disk media 106 and/or the server 110 over the network 112. Additional security information may be transferred to the players 104 via the card media 108 and/or the server 110 over the network 112.

The disk media 106 may be implemented as an optical disk media. In one embodiment, the disk media 106 may be a DVD-video (DVD-V) disk, a DVD-Rewritable (DVD-RW) disk, a DVD-ROM disk, a DVD-Video Recording (DVD-VR) disk, and Enhanced Versatile Disk (EVD) or the like. The disk media 106 may be designed to be physically incompatible with conventional DVD readers, such as in personal computers and home entertainment systems. Other forms of media, such as tape and cassettes, may be implemented to meet the criteria of a particular application.

The card media 108 may be implemented as a smart card. In one embodiment, the smart card 108 may be compliant with an International Organization for Standardization (ISO) standard 7816. In another embodiment, the smart card may be implemented as a Universal Serial Bus (USB) plug-in module. The plug-in module implementation may include an optional USB modem for Internet-based authentication and may carry new firmware to distribute security upgrades to the players 104. Other designs of the card media 108 may be implemented to meet the criteria of a particular application. The smart card 108 generally allows for limited and total renewability, including recovery from a system-wide hack, by exchanging the smart cards 108. The smart card 108 may provide a mechanism for a user entered password to enable decryption. As such, an unauthrorized user in possession of an authorized player 104 may be prevented from viewing the protected content. Authentication of the password may be based on information stored in (i) the disk media 106, (ii) the player 104 or (iii) the server 110.

The server 110 may be referred to as a license server. The license server 110 may be operational to authenticate the players 104 and provide keys to the authenticated players 104. The license server 110 may also be operational to store the secured content and associated information is if stored on the disk media 106. In one embodiment, transportation of the secured content may thus be performed over the network 112 instead of physical movement of the disk media 106.

For network-based operations, a disk media 106 may be inserted into a player 104, an optional password entered, and a "play" function started. A modem in the player 104 may contact the license server 110 and perform mutual authentication. The player 104 may transmit a player identification value, a media identification (ID) value stored in the disk media 106, a Control Access System (CAS) identification (ID) value stored in the smart card 108 and the password to the license server 110. The license server 110 may verify a playback permission, calculate a transaction ID value (e.g., 40-bit value) and send both the transaction ID value and a class key (e.g., back to the player 104.) A log in the license server 110 may record the transaction along with the associated player ID value, media ID value, date, time and CAS ID value. Transmission of the class key may be protected by an Authenticated Key Exchange (AKE)-over-IP process. The playback authorization may persist for a few hours and then self-terminate. The transaction ID value may be used in a video watermark payload present in virtually all frames and on all outputs of the player 104.

The system 100 generally provides studio-controlled creation and distribution of the secured content. The secured content may be generated using a studio-proprietary encryption implemented in the recorder 102. The studio-proprietary encryption may restrict copying of the secured contents from the disk media 106 for transmissions on the network 112. Publicly-vetted cipher and key management schemes may be utilized in the system 100.

Playback of the secured content may be limited by studio-controlled distribution of the players 104, disk media 106 and the smart cards 108. The players 104 may implement a studio-proprietary decryption. In general, the players 104 may be distributed to award voters, studio production people and other people intended to view some or all of the secured content. Each of the players 104 may be associated with an individual user, by name, for (i) traceability to a source of unauthorized copies and (ii) revoking conditional access when appropriate. Session-based forensically-traceable watermarks may be provided on all outputs at the player 104 using a frequency-domain technology developed by MediaSec (Providence, R.I.) and VeriMatrix (San Diego, Calif.). Other watermarks, such as pixel domain watermarking, may be implemented to meet the criteria of a particular application. Playback may be restricted to classes of subscribers established by authentication.

Distribution of the players 104, disk media 106 and the smart cards 108 may be kept relatively small in volume. The smart card 108 may be used to authenticate playback of the secured content stored in the disk media 106 for one or more players 104. The smart card 108 may allow the studio to renew conditional access and/or revoke access to the content. Information transported by the disk media 106 and in the smart card 108 may permit playback in one or more authenticated classes of subscribers.

Figure 2:
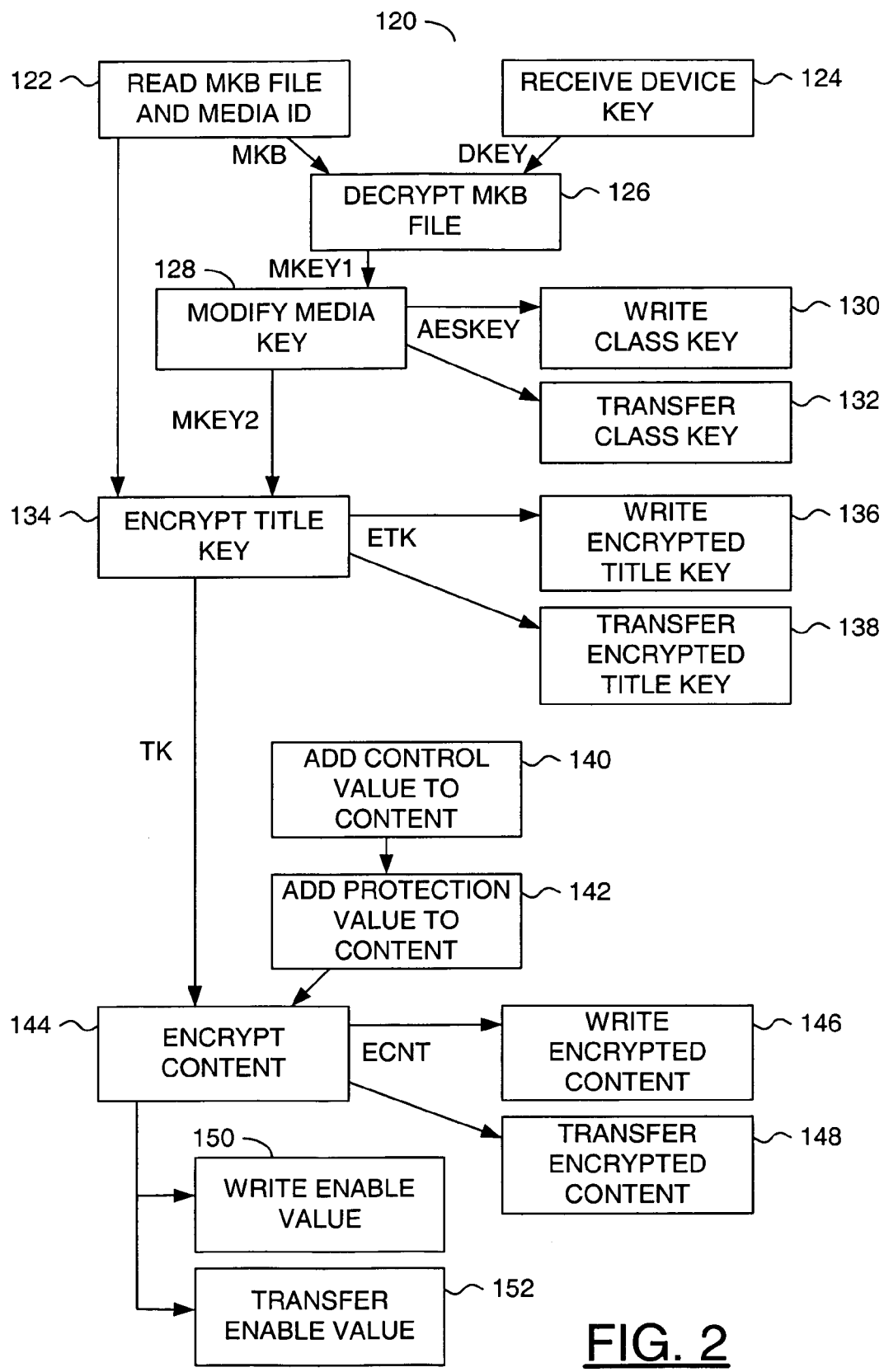
FIG. 2 is a flow diagram of an example implementation of an authoring process for a secure content.

Referring to FIG. 2, a flow diagram of an example implementation of an authoring process 120 for a secure content is shown. The authoring process (or method) 120 generally comprises a step (or block) 122, a step (or block) 124, a step (or block) 126, a step (or block) 128, a step (or block) 130, a step (or block) 132, a step (or block) 134, a step (or block) 136, a step (or block) 138, a step (or block) 140, a step (or block) 142, a step (or block) 144, a step (or block) 146, a step (or block) 148, a step (or block) 150 and a step (or block) 152. The authoring process 120 may be implemented in the recorder 102.

A description of the authoring process 120 may start with reading (e.g., step 122) a Media Key Block (MKB) file and the media ID value from the disk media 106. Both the MKB file and the media ID value may be prerecorded on the disk media 106. A particular device key may be determined (e.g., step 124) from a set of device keys defined by the MKB file. The particular device key may uniquely identify a target player 104 being authorized to view the secured contents. The set of device keys generally identifies all potential players 104 that may be authorized.

The particular device key may be used to determine a media key by decrypting the MKB file (e.g., step 126). The media key may be modified (e.g., step 128) using a class key. The class key may be written (e.g., step 130) in the smart card 108 and/or transferred (e.g., step 132) to the server 110.

A secret title key may be encrypted (e.g., step 134) based on both the modified media key and the media ID value to provide an encrypted title key. The encrypted title key may be written (e.g., step 136) in the disk media 106 and/or transferred to the server 110 (e.g., step 138).

One or more control bits (or a control value) may be added (e.g., step 140) to the content. The control value may establish one or more permissions for the players 104. The permissions may include, but are not limited to, a view and listen-only permission, a view-only permission, a listen-only permission, a copy permission, password protection permission and the like.

One or more protection bits (or a protection value) may be added (e.g., step 142) to the content. The protection value may enable/disable an analog protection mechanism in the players 104 designed to frustrate copying of an analog signal representation of the content. In one embodiment an Analogue Protection System (APS), developed by Macrovision Corporation (Santa Clara, Calif.), may be implemented to add information to an analog output of the players 104 that confuses automatic gain control and/or synchronization circuitry in video cassette recorders.

The title key may be used to encrypt (e.g., step 144) the content, with the embedded control value and protection value, to generate the secured content. The secured content may also be referred to as an encrypted content. The encrypted content may be written (e.g., step 146) in the disk media 106 and/or transferred (e.g., step 148) to the server 110.

An enable value may be written (e.g., step 150) in the smart card 108 and/or transmitted (e.g., step 152) to the server 108 in an enabled state (e.g., a predetermined value or a presence in the media). The enabled state generally instructs the players 104 that a media key should be decrypted before being used to decrypt the encrypted title key. The enable value in a disabled state (e.g., a predetermined value or an absence from the media) generally instructs the players 104 not to modify the media key.

Where the secured content is written on the disk media 106, the media ID value used to encrypt the title key may bind the secured content to the disk media 106. The device key used to decrypt the media key from the MKB file generally binds the secured content to the particular player 104. The class key in the smart card 108 generally enables decryption of the secured content on the players 104 and authenticates a class of subscriber to view the playback of the decrypted content.

Where the secured content is stored in the server 110, the media ID, MKB file, encrypted title key and the encrypted content, with the embedded control value and the protection value, may be treated as if stored on the disk media 106. For example, the media ID, MKB file, encrypted title key and the encrypted content may be transmitted to the players 104 in the same sequence as would be read from the disk media 106.

In one embodiment, the recorder 102 may implement a modified Content Protection for Removable Media (CPRM) encryption process. The modified CPRM may securely bind the content to a particular disc media 106. The binding generally frustrates disc-to-disc copying, bit-for-bit copying and peer-to-peer file sharing. Other encryption techniques may be implemented to meet the criteria of a particular application.

Figure 3:
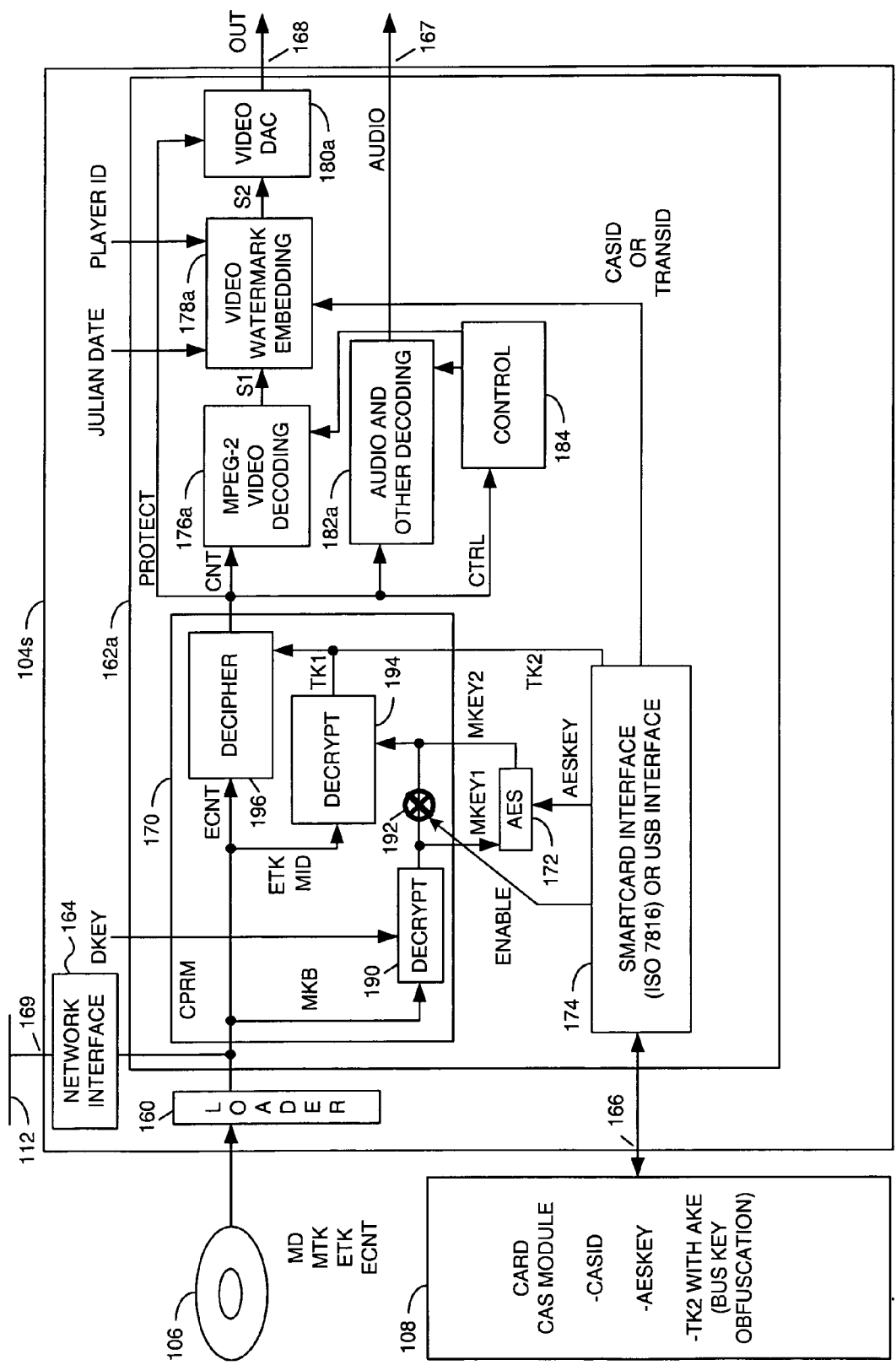
FIG. 3 is a block diagram of an example implementation of a video player.

Referring to FIG. 3, a block diagram of an example implementation of a first player 104s is shown. The payer 104s may be any of the players 104a-104n and may be implemented as a video player. The player 104s generally comprises a loader (or drive) 160, a circuit (or module) 162a and an optional circuit (or module) 164. An interface 166 of the player 104s may be configured to connect with the smart card 108. An output 167 of the player 104s may provide one or more audio signals (e.g., AUDIO). An output 168 of the player 104s may provide the video signal OUT. An interface 169 of the player 104s may be configured to connect with the network 112.

The loader 160 may be operational to read the disk media 106. The loader 160 may be an optical disk drive, magnetic drive, or other mass storage device. The circuit 162a may be referred to as a codec circuit. The codec circuit 162a may be implemented as a single system-on-chip die to frustrate hacking attempts. The circuit 164 may be referred to as a network interface circuit. The network interface circuit 164 may be operational to communicate on the network 112. The codec circuit 162a may receive data from the loader 160 read from the disk media 106 and/or data from the network interface circuit 164 received across the network 112. The network circuit 164 may also present a transaction ID value (e.g., TRANSID) to the codec circuit 162a.

The codec circuit 162a generally comprises a circuit (or module) 170, a circuit (or module) 172, a circuit (or module) 174, a circuit (or module) 176a, a circuit (or module) 178a, a circuit (or module) 180a, a circuit (or module) 182a and a circuit (or module) 184. The circuit 170 may be referred to as a cipher circuit. The cipher circuit 170 may be operational to decrypt the encrypted content (e.g., ECNT), present the content (e.g., CNT) to the circuits 176a and 182a, present the media key (e.g., MKEY1) to the circuit 172, receive a modified media key (e.g., MKEY2) from the circuit 172 and receive an alternate title key (e.g., TK2) from the circuit 174. In one embodiment, the cipher circuit 170 may be operational to implement a modified CPRM decryption process.

The circuit 172 may be referred to as a modification circuit. The modification circuit 172 may be operational to generate the modified media key MKEY2 based on the media key received from the cipher circuit 170 and a class key (e.g., AESKEY) received from the circuit 174. The modified media key MKEY2 may be returned to the cipher circuit 170. In one embodiment, the modification circuit 172 may implement an Advanced Encryption Standard (AES) decryption.

AES-encryption of the media key MKEY1 before encrypting the title key (e.g., TK1) may make the modified media key MKEY2 unique for each class of screener subscriber. The modified media key MKEY2 may have a different value in each of the players 104s. Only authorized players 104s may recalculate the proper media key MKEY2 for decrypting the secret title key TK1 stored on the disc media 106.

The circuit 174 may be referred to as a smart card interface circuit. The smart card interface circuit 174 may be operational to read the class key AESKEY, the enable value (e.g., ENABLE) and a conditional access system (CAS) identification (ID) value (e.g., CASID) unique to the smart card 108. The class key AESKEY may be presented to the modification circuit 172. The value ENABLE may be presented to the cipher circuit 170. The CAS ID value may be presented to the circuit 178a.

The circuit 176a may be referred to as a video decoding circuit. The video decoding circuit 176a may be operational to perform video decoding of the content received from the cipher circuit 170 to generate an intermediate video signal (e.g., S1). The video decoding circuit 176a may also perform subpicture decoding. In one embodiment, the video decoding circuit 176a may implement an MPEG-2 compliant decoding. In another embodiment, the video decoding circuit 176a may implement an H.264/AVC-10 compliant decoding. Other coding standards may be implemented to meet the criteria of a particular application. The video signal S1 may be presented to the circuit 178a.

The circuit 178$_a$ may be referred to as a watermark circuit. The watermark circuit 178$_a$ may be operational to watermark select frames of the video signal S1 received from the video decoding circuit 178$_a$. The watermarking may embed one or more of a date (e.g., Julian date), a player identification value (e.g., PID) unique to each of the players 104, the CAS ID value and/or a transaction ID value (e.g., TRAKSID) into the frames. A watermarked video signal (e.g., S2) may be presented to the circuit 180$_a$. Additional details regarding watermarking may be found in copending U.S. patent application Ser. No. 11/017,423, filed Dec. 20, 2004 and hereby incorporated by reference in its entirety.

The circuit 180a may be referred to as a video digital to analog converter (DAC) circuit. The video DAC circuit 180a may be operational to convert the watermarked video signal S2 into an analog signal (e.g., the video signal OUT) at the output 168. The video DAC circuit 180a may implement the APS system by Macrovision when enabled through the protection value. The APS system anti-taping capability should be enabled when operating on content authored by the recorder 102. The player 104s may respond to the APS bits even for discs not protected by a Content Scrambling System (CSS) process.

The circuit 182a may be referred to as an audio decoder circuit. The audio decoder circuit 182a may be operational to decode audio and other information from the reconstructed content receive from the cipher circuit 170. The signal AUDIO may be presented at the output 167.

The circuit 184 may be referred to as a control circuit. The control circuit 184 may be operational to control the video decoding circuit 176a and the audio decoding circuit 182a based on the control value received from the cipher circuit 170. Control over the video and audio decoding may be used to implement related permissions, such as video-only and audio-only permissions.

The cipher circuit 170 generally comprises a circuit (or module) 190, a circuit (or module) 192, a circuit (or module) 194 and a circuit (or module) 196. The circuit 190 may be referred to as a first decryption circuit. The first decryption circuit 190 may be operational to decrypt the MKB file based on a device key unique to the player 104s to generate the media key.

The circuit 192 may be referred to as a gate circuit. The gate circuit 192 may be operational to pass/block the media key MKEY1 to the circuit 194 in response to the value ENABLE. When the enable value is asserted in the enabled state, the gate circuit 194 may block a path for the media key MKEY1 between the first decryption circuit 190 and the circuit 194. When the enable value is deasserted in a disabled state, the gate circuit 194 may pass the media key MKEY1 directly from the first decryption circuit 190 to the circuit 194. Bypassing the modification circuit 172 generally allows a player 104 to decrypt content protected by the conventional CSS technique.

The circuit 194 may be referred to as a second decryption circuit. The second decryption circuit 194 may be operational to decrypt an encrypted title key (e.g., ETK) based on the media key (modified or not) and the media ID value to reconstruct the title key TK1. The title key TK1 may be presented to the circuit 196.

The circuit 196 may be referred to as a third decryption circuit. The third decryption circuit 196 may be operational to perform a conventional class C2 decryption (provided by the U.S. National Computer Security Center, Ft. Meade, Md.) on the encrypted content ECNT based on the title key TK1 received from the second decryption circuit or the alternate title key TK2 received from the smart card interface circuit 174. C2 encryption (recorder 102) and decryption (players 104) generally binds the content to the players 104. The C2 cipher may associate the content with a particular player 104 such that the secured content may not play back on any other player 104.

When the gate circuit 192 is passing the media key MKEY1 unaltered, a combination of the first decryption circuit 190, the second decryption circuit 194 and the third decryption circuit 196 may implement the CPRM decryption to accommodate conventional CPRM protected recordings satisfying a 4C license. The CPRM decryption may also accommodate conventional CSS-protected DVD-Video titles. The modified CPRM process may be transparent to a subscriber viewing the content. For example, trick features such as fast forward and pause may all work as normally.

The permission value may provide hierarchically classified tiered permissions to separate screener classes by studio, by project, or similar classifications. For example, classes may include, but are not limited to, Digital Dailies, Award voters, post-production departments and project producers. Classes may also allow studio executives to view any project from their own company. The permission value may also establish permission for playback-only or record in secure format. Corresponding classes may be established for other industries, such as the television industry.

Figure 4:
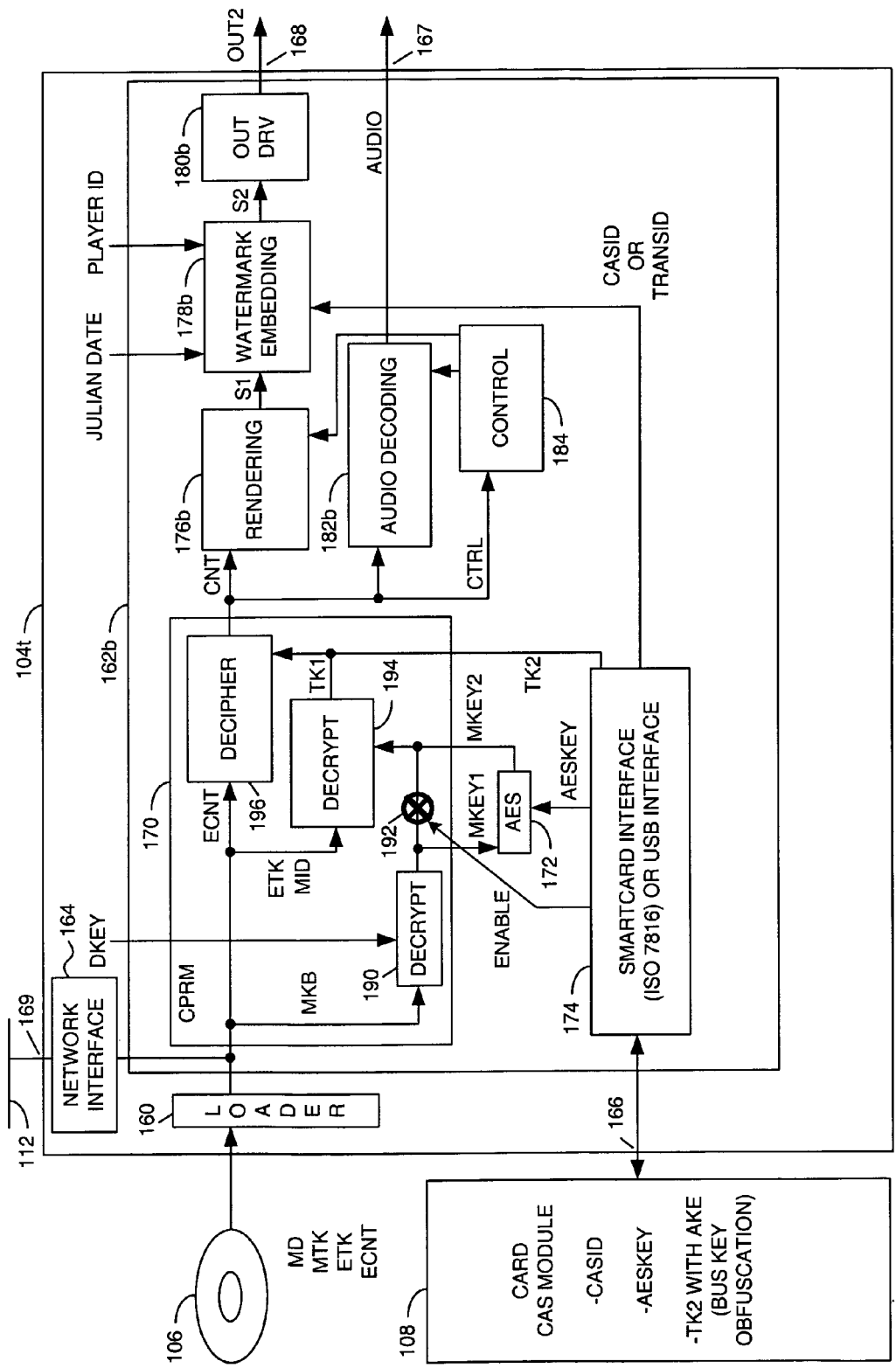
FIG. 4 is a block diagram of an example implementation of a player.

Referring to FIG. 4, a block diagram of an example implementation of a second player 104t is shown. The player 104t may be similar to the player 104s but configured to operate on non-video type data. The non-video type data may include, but is not limited to, viewable data, non-viewable data and audio data. The player 104t may be any of the players 104a-104n.

The player 104t generally comprises the loader (or drive) 160, a circuit (or module) 162b and the optional circuit (or module) 164. The interface 166 of the player 104t may be configured to connect with the smart card 108. The output 167 of the player 104t may provide one or more audio signals (e.g., AUDIO). The output 168 of the player 104t may provide a signal (e.g., OUT2). The interface 169 of the player 104t may be configured to connect with the network 112.

The circuit 162b generally comprises the cipher circuit 170, the modification circuit 172, the smart card interface circuit 174, a circuit 176b, an optional circuit 178b, a circuit 180b, a circuit 182b and the control circuit 184. The interface 166 of the player 104t may be configured to connect with the smart card 108.

The circuit 176b may be referred to as a rendering circuit. The rendering circuit 176b may be operational to perform a rendering of the content received from the cipher circuit 170 to generate the intermediate signal (e.g., S1). In one embodiment, the rendering circuit 176b may be operational to render non-video content such as, but not limited to, subscription research reports, scripts, blueprints, still photos, schematic drawings, equity analysis reports, pre-release books, data files, audio streams and the like. For example, the rendering circuit 176b may convert the content into a conventional PDF, JPG or TIFF format. In another embodiment, the rendering circuit 176b may include a decoding capability. The intermediate signal S1 may be presented to the circuit 178b.

The circuit 178b may be referred to as a watermark circuit. The watermark circuit 178b may be operational to watermark the content of the intermediate signal S1 received from the rendering circuit 176a, where appropriate. The watermarking may embed one or more of a date (e.g., Julian date), a player identification value (e.g., PID) unique to each of the players 104t, the CAS ID value and/or a transaction ID value (e.g., TRANSID) and an indication of confidentiality. The watermarking may be visible, subtle or non-visible depending on the application and/or the keys, class, subclass or a network enable command. A watermarked intermediate signal (e.g., S2) may be presented to the circuit 180b. The watermark circuit 178b may be eliminated (e.g., signal S2=signal S1) in applications having content not suitable for watermarking.

The circuit 180b may be referred to as an output driver circuit. The output driver circuit 180b may be operational to convert the watermarked intermediate signal S2 into a signal (e.g., the signal OUT2) suitable for transmission, reproduction and/or storage. For example, the output driver circuit 180b may be a printer driver, a television monitor driver (e.g., a component output driver for a high-definition television), a network driver, a storage device driver or similar driver suitable to generate the signal OUT2 for a particular application.

The circuit 182b may be referred to as an audio decoder circuit. The audio decoder circuit 182b may be operational to decode audio information from the reconstructed content receive from the cipher circuit 170. The signal AUDIO may be presented at the output 167.

The players 104 may provide a forensically-traceable, session-based watermarks or real-time traceable watermarks. The watermarking generally associates the content with an originating player 104, a date, and a particular smart card module 108. Every playback frame of video may be watermarked (e.g., 100,000 to 200,000 frames per film). The redundancy in watermarks generally increases a degree of certainty at a detection phase. Discrete Cosine Transform (DCT) coefficient pairs may be manipulated to implement the watermarks, provided the change is not too visible. Embedded signal strength may also be adjusted in accordance with local image activity to avoid visibility.

The watermarking may embed one or more bits in select 8×8 transfer blocks. The watermark circuit 178a generally watermarks approximately 30 to 40 blocks per frame in real time during playback, depending on computational complexity of a perceptual model and the embedding may be performed entirely on-chip (e.g., no external path to hack or bypass). Fractional bits per block may also be used in comparing coefficients across different macroblocks or pictures. An example watermark payload may include:
  Player-unique ID 17 bits=131,000 players
  Julian date 12 bits=11 years
  CAS ID 18 bits=262,000 modules An approximately 29-bit to 47-bit total watermark payload may be generated to help identify the player 104 involved in unauthorized copying.

Forensic detection and tracking software may be executed on a workstation to examine a suspected illegal copy. Records of embedding procedures may be maintained to aid in the watermark detection. For example, records may be kept to identify where the watermark signal was embedded and locations of coefficient manipulations may be known in advance for each title.

In cases where high volume distribution is involved (e.g., distribution to Award Screeners), DVD-ROM disks may be utilized with the media ID value being unique per master disk (e.g., unique per stamping run). In one embodiment, a Burst Cutting Area (BCA) in the disk media 106 may be written to store a unique media ID value for each disk.

Conventional DVD-Video authoring may be used to take advantage of available encoding and authoring tools. The modified CPRM encryption may be performed by the recorder 102 after the authoring.

The function performed by the flow diagram of FIG. 2 and the block diagrams of FIGS. 3 and 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for securing a content, comprising the steps of:
(A) receiving said content at a recorder from a source;
(B) receiving a class key at said recorder from an owner of said content;
(C) reading a media key block and a media identification value of a medium with said recorder, said media key block containing a set of encrypted keys;
(D) generating a first media key with said recorder by decrypting at least one encrypted key from said set of encrypted keys in said media key block based on a device key, wherein said device key is unique to a particular player of a plurality of players;
(E) assigning a second media key to one of a plurality of subscriber classes with said recorder by applying a decryption cipher to said first media key using said class key;
(F) generating an encrypted title key with said recorder by encrypting a title key based on both said second media key and said media identification value;
(G) generating an encrypted content with said recorder by encrypting said content based on said title key; and
(H) writing said encrypted content and said encrypted title key in said medium with said recorder.

2. The method according to claim 1, further comprising the step of:
writing said class key in a smart card.

3. The method according to claim 2, further comprising the step of:
setting an enable value in said smart card, wherein said enable value enables regeneration of said second media key in each of said players.

4. The method according to claim 2, further comprising the step of:
writing said title key in said smart card.

5. The method according to claim 1, further comprising the step of:
writing data in one of (i) said medium and (ii) a smart card, wherein said data authenticates a password entered at said particular player.

6. The method according to claim 1, further comprising the step of:
writing a control value in said medium, wherein said control value controls media to control a plurality of permissions in said players to use said content.

7. The method according to claim 1, further comprising the step of:
writing a protection value in said medium, wherein (i) said protection value enables an analog protection system in said particular player and (ii) said analog protection system hampers copying of an analog signal representation of said content.

8. The method according to claim 1, further comprising the step of:
writing an enable value in said medium, wherein said enable value enables regeneration of second media key in each of said players.

9. The method according to claim 1, further comprising the step of:
writing said class key to a license server, wherein said license server is in communication with said players via a network.

10. The method according to claim 9, further comprising the steps of:
authenticating said particular player at said license server; and transmitting said class key from said license server to said particular player across said network in response to passing said authenticating.

11. A method for playing an encrypted content received in a first medium, comprising the steps of:
(A) reading a media key block, a media identification value, an encrypted title key and said encrypted content from first medium with a particular player of a plurality of players, said media key block containing a set of encrypted keys;
(B) obtaining a class key from a second medium with said particular player;
(C) generating a first media key with said particular player by decrypting at least one encrypted key from said set of encrypted keys in said media key block based on a device key, wherein said device key is unique to said particular player;
(D) generating a second media key that has been assigned to one of a plurality of subscriber classes with said particular player by applying a decryption cipher to said first media key using said class key;
(E) generating a title key with said particular player by decrypting said encrypted title key based on both said second media key and said media identification value;
(F) generating a content with said particular player by decrypting said encrypted content based on said title key; and
(G) generating an output signal carrying said content with said particular player.

12. The method according to claim 11, wherein (i) said second medium comprises a smart card and (ii) said obtaining said class key comprising reading said class key from said smart card.

13. The method according to claim 12, further comprising the steps of:
reading an enable value from said smart card; and
enabling said generation of said second media key in response to said enable value.

14. The method according to claim 11, further comprising the steps of:
reading a control value from said first medium; and
controlling a plurality of permissions to use said content in response to said control value.

15. The method according to claim 11, further comprising the step steps of:
reading a protection value from said first medium; and
modifying an analog signal representation of said content in response to said protection value, to hamper copying of said content in said analog signal.

16. The method according to claim 11, further comprising the steps of:
reading an enable value from said second medium; and
enabling said generation of said second media key in response to said enable value.

17. The method according to claim 11, further comprising the step of:
authenticating said particular player at a license server, wherein (i) said second medium comprises a network and (ii) said obtaining said class key comprises receiving said class key at
said particular player from said license server over said network in response to passing said authenticating.

18. The method according to claim 11, further comprising the steps of:
reading another title key from a smart card; and
replacing said title key with said other title key.

19. The method according claim 11, further comprising the step of:
watermarking said content with a player identification value, wherein said player identification value is unique to said particular player.

20. The method according to claim 19, further comprising the steps of:
reading a card identification value of said second medium; and
embedding said card identification value in said watermarking.

21. The method according to claim 19, further comprising the steps of:
authenticating said particular player with a license server;
receiving a transaction identification value at said particular player from said license server in response to passing said authenticating; and
embedding said transaction identification value in said watermarking.

22. The method according claim 11, further comprising the steps of:
receiving a user identification value of a user of said particular player, wherein said user identification value is unique to said user; and
watermarking said content with said user identification value.

23. The method according to claim 11, further comprising the steps of:
receiving a password from a user;
authenticating said password; and
enabling said generation of said content in response to passing said authenticating.

24. A method of screening a content, comprising the steps of:
(A) receiving said content at a recorder from a source;
(B) receiving a class key at said recorder from an owner of said content;
(C) reading a media key block and a media identification value of a first medium with said recorder, said media key block containing a set of encrypted keys;
(D) generating an encrypted content with said recorder by encrypting said content based on a title key;
(E) generating a media key with said recorder based on (i) said class key, (ii) a particular key decrypted from at least one encrypted key from said set of encrypted keys in said media key block, and (iii) a device key, wherein said device key is unique to a particular player of a plurality of players;
(F) assigning said media key to one of a plurality of subscriber classes with said recorder;
(G) generating an encrypted title key by encrypting said title key based on (i) said media identification value and (ii) said media key;
(H) transferring (i) said encrypted content and said encrypted title key via said first medium and (ii) said class key via a second medium from said recorder to said particular player; and
(I) regenerating said media key with said particular player based on (i) said particular key decrypted from said at least one encrypted key from said set of encrypted keys in said media key block, (ii) said class key and (iii) said device key;
(J) regenerating said title key with said particular player based on (i) said encrypted key, (ii) said media identification value and (iii) said media key;
(K) regenerating said content with said particular player by decrypting said encrypted content based on said title key; and
(L) generating an output signal carrying said content with said particular player.

25. The method according to claim 24, further comprising the steps of:
receiving a password from a user; and
authenticating said password, wherein said generating of said content is further based on passing said authenticating.

26. The method according to claim 24, wherein said content is at least one of a video stream, an audio stream, a text document, a still image and a data file.

* * * * *